United States Patent [19]
Kheyfets

[11] Patent Number: 5,904,956
[45] Date of Patent: May 18, 1999

[54] FILTER FOR SEPARATING WATER FROM FUEL

[75] Inventor: Joseph B. Kheyfets, Mobile Post Har-Hebron, Israel

[73] Assignee: I.R.D. Fuel Technologies Ltd., Qiriat Ono, Israel

[21] Appl. No.: 08/951,794

[22] Filed: Oct. 16, 1997

[30] Foreign Application Priority Data

Oct. 16, 1996 [IL] Israel ......................................... 119432

[51] Int. Cl.⁶ ...................................................... B05D 5/00
[52] U.S. Cl. ....................... 427/244; 210/435; 210/500.1; 210/503; 427/322; 427/387
[58] Field of Search ................................... 427/244, 322, 427/387; 210/435, 500.1, 503

[56] References Cited

U.S. PATENT DOCUMENTS 5,164,084  11/1992  Danowski et al. ............... 210/493.5 X
5,714,030   2/1998  Kitamura et al. .................... 524/423 X

*Primary Examiner*—Michael Lusignan
*Attorney, Agent, or Firm*—Pearne, Gordon, McCoy & Granger LLP

[57] ABSTRACT

A filter for separating water from hydrocarbon fuel includes fibers rendered hydrophobic with a silane surface treatment preceded by contact with a cationic surfactant in an aromatic hydrocarbon solvent.

10 Claims, No Drawings

FILTER FOR SEPARATING WATER FROM FUEL

FIELD OF THE INVENTION

Separation of water from fuel destined to feed internal combustion, jet or turbojet engines, is vital for the protection of engine and engine parts against undesired phenomena such as starvation, detonation, intermittent power fluctuation and corrosion.

According to the present invention there is provided a novel type of filter which consists of or contains a large quantity of fibers rendered hydrophobic by a suitable treatment, thus resulting in a filter which selectively permits passage of fuel, while preventing any appreciable passage there through of water, which coalesces and drips off to be subsequently collected.

BACKGROUND OF THE INVENTION

Coalescence of water droplets is a well known phenomenon and is the basis of coalescence filters, which are known and used for separating water from fuel at the upstream side of the engine. The operation of coalescent filters is based on the idea of creating an —OH group molecular structure on its surface. An —OH group, while acted on by a water molecule, reacts on the water drop surface, annexes it and diminishes its durability. Water drops continue to aggregate and accumulate around this nucleus of water until the water drop grows to a size large enough to detach it from the surface and fall down by gravity forces to the filter sump. In this mechanism, the filter surface is always partially clogged by a thin film of water on the outer surface of the filter due to a strong interaction with hydroxyl groups.

Absorption filters use hydrophilic surfaces that absorb water and are transversed by hydrocarbon fluids. Water absorption causes gradual saturation of the paper filter, that is limited to a specific water capacity, beyond which it is clogged and loses its capability to pass the necessary fuel flow to the engine i.e., causing engine starvation.

SUMMARY OF THE INVENTION

The present invention relates to hydrophobic filter elements that repel water drops (and eliminate any kind of absorption). In this filter there are no active —OH elements on the filter surface. Such a filter passes selectively fuel, while preventing water penetration. Thus such a filter:

a. rejects any water drop that has a diameter larger than ⅓ of the capillary diameter of the filter element;

b. prevents clogging of the upstream surface of the filter (as with coalescence filters) and/or the absorption of water (as with absorption filters) that ends in swelling and later in the clogging of the filter;

c. passes selectively fuel, in an essentially unhindered manner.

It is known that hydrophobization of mineral fibers may be achieved by treating or contacting them at elevated temperatures (180 to 250° C. and above) so as to provide a silane group. The hydrophobization regime is so severe that it causes microcracks in the filter fiber materials and causes detachment of the —OH groups. This mechanism is equivalent to a "short circuit" in the filter that is a direct result of the existence of certain zones where —OH groups are present on the surface that are partially hydrophobic.

To overcome this difficulty, according to the present invention the filter material is activated before implementing the hydrophobization treatment using a silane group treatment. This activation process comprises treating or contacting the fiber or filter surface with a surfactant or a silane or a combination of both in an aromatic hydrocarbon solvent. A preferred treatment comprises the use of a cationic surfactant in an aromatic hydrocarbon solvent. The treatment enables:

a. performing the hydrophobization at a considerably lower temperature;

b. preventing cracks in the mineral fibers;

c. effecting a complete hydrophobization of all hydrophilic centers on the mineral fibers;

d. protecting any organic element of other materials of the filter cartridge against reacting with the silane and oxides that are formed as a result of the reaction to hydrophobization; and e. performing hydrophobization of organic fibers surface that are part of the filter material.

Filter elements produced from such fibers, or containing a high percentage of these, selectively reject water passage while permitting unhindered passage of fuel through such filter elements.

Three series of tests were performed in a test cell under controlled test conditions. The hydrophobization process was performed on different material compositions of filters, i.e., cellulose, cotton, glass-fibers, synthetic fibers and other materials used in commercial filter paper production, and having a porosity of about 2 to 50 microns.

The tests were performed with diesel fuel in a temperature controlled chamber according to SAE J1488 and SAE J1839 and a steady state temperature of 40° F. Fuel flow was kept at 40 GPM and a test duration of 40 min. was used. A water content of 1, 2 and 3% (by volume) was added to the fuel load line, and accumulated and sedimenting water was removed, when necessary, from the filter sump. Test samples were taken every 10 min. Resulting fuel contained from 90 to 500 ppm water downstream of the filter. It is expected that upon modification of the 500 ppm fuel purity filter material, filters with even better results can be achieved.

The following table contains is a summary of examples of treatment of different filter compositions with different chemical compositions by dipping therein followed by drying and the results obtained.

| Filter Materials (%) | | Chemical Composition (%) Treatment Solution Water Separator | | | | Separate Capability | | |
|---|---|---|---|---|---|---|---|---|
| | | Chloro-Silane | | Surfactants (1) Alkyl- | Temp. | | | |
| mineral fibers glass-fibers | organic fibers cellulose | Dimethyl-Dichloro-Silane 100 gr mineral | Aromatic Hydro-Carbons Xylene(5) | Benzyl Dimethyl-Ammonium-Chloride | Conditions Treatment Temp. ° C. | % of (2) water separated Test Results | Remarks Hydrophobization results | |
| 100 | — | 100 | (−) | — | 180 | 52 | partial | |
| 100 | — | 100 | (−) | — | 50 | 48 | partial | |
| 100 | — | 10 | (+) | — | 50 | 96 | complete | |
| 100 | — | 10 | (+) | — | 30 | 72 | partial | |
| 100 | — | 10 | (+) | .5 | 50 | 97 | complete(3) | |
| 100 | — | 3 | (+) | — | 50 | 85 | partial | |
| 100 | — | 15 | (+) | — | 30 | 78 | partial | |
| 100 | — | 15 | (+) | — | 50 | 95 | complete(4) | |
| 20 | 80 | 2 | (+) | 1.6 | 56 | 93 | fair | |
| 30 | 70 | 3 | (+) | 1.4 | 50 | 96 | complete | |
| 50 | 50 | 5 | (+) | 1 | 50 | 97 | complete | |
| 50 | 50 | 5 | (+) | .3 | 50 | 67 | poor | |
| 0 | 100 | 0 | (+) | 1.0 | 50 | 97 | complete | |
| 0 | 100 | 0 | (+) | 1.0 | 25 | 75 | incomplete | |

Notes concerning the Table:
(1)Figures shown might be changed, depending on the kind and ratio between other materials and chemicals.
(2)Percent of water separation capability from an emulsion of 1% of water in diesel fuel.
(3)Results are similar to raw No. 3 but using surfactant. Process is not cost-effective.
(4)Results are similar to raw No. 3 but using larger quantity of Chloro-Silane. Process is not cost-effective.
(5)The volume of xylene when used (+) is equal in volume to the volume of the filter cartridge.

The above results indicate that the novel principle of hydrophobic fibrous filter units for the selective separation water, with unhindered fuel passage, are highly effective. Optimum results can be obtained by a proper choice of the filter material, the hydrophobization process and the configuration of the filter elements.

It is clear that hydrophobization of the fibers can be carried out, using other chemical compounds known for this purpose.

I claim:

1. A process for the production of fuel filters which selectively pass fuel while preventing passage of water, which comprises providing fibers including surfaces having —OH groups, effecting a hydrophobization of the fibers to suppress the presence of —OH groups on the fiber surfaces and thereby increase the selectivity of fuel passage and water separation, and forming from these fibers a filter element including a filtering portion having a thickness through which the passage of fuel is permitted and the passage of water is rejected.

2. A process according to claim 1, wherein the hydrophobization is effected on mineral fibers by a surface treatment introducing silane groups.

3. A process according to claim 1, wherein the fibers are treated by a surfactant or solution of such surfactant in an aromatic solvent prior to the step of effecting a hydrophobization of the fibers.

4. A process according to claim 2, wherein a silane compound is used in the hydrophobization, said silane comprising chlorosilane or dimethyl-dichlorosilane or trimethyl chlorosilane.

5. A process according to claim 2, wherein the fibers are treated by a surfactant or solution of such surfactant in an aromatic solvent prior to the step of effecting a hydrophobization of the fibers.

6. A process according to claim 5, wherein a silane compound is used in the hydrophobization, said silane comprising chlorosilane or dimethyl-dichlorosilane or trimethyl chlorosilane.

7. A process according to claim 3, wherein a silane compound is used in the hydrophobization, said silane comprising chlorosilane or dimethyl-dichlorosilane or trimethyl chlorosilane.

8. A process according to claim 1, wherein the fibers are treated by a surfactant or solution of such surfactant in an aromatic solvent prior to the step of effecting hydrophobization of the fibers at a temperature in the range of from 25° to 180° C.

9. A process according to claim 2, wherein the fibers are treated by a surfactant or solution of such surfactant in an aromatic solvent prior to the step of effecting hydrophobization of the fibers at a temperature in the range of from 25° to 180° C.

10. A process for the production of fuel filters which selectively pass fuel while preventing passage of water, which comprises providing a fuel filter having a filter element including a filtering portion having a thickness formed of fibers with surfaces having —OH groups, effecting a hydrophobization of the filter element to suppress the presence of —OH groups on the fiber surfaces and thereby increase the selectivity of fuel passage and water separation, and arranging said filter element for flow through said filtering portion thickness to permit the passage of fuel and reject the passage of water.

* * * * *